United States Patent [19]

Fukumoto

[11] Patent Number: 4,788,754

[45] Date of Patent: Dec. 6, 1988

[54] HOOK FOR A WIRE-TYPE WINDOW REGULATOR

[75] Inventor: Ryoichi Fukumoto, Nagoya, Japan

[73] Assignee: Aisin Seiki Kabushiki Kaisha, Japan

[21] Appl. No.: 77,037

[22] Filed: Jul. 21, 1987

Related U.S. Application Data

[63] Continuation of Ser. No. 741,480, Jun. 5, 1985, abandoned.

[30] Foreign Application Priority Data

Jun. 6, 1984 [JP] Japan ............................ 59-84815[U]

[51] Int. Cl.⁴ ............................................. F16G 11/00

[52] U.S. Cl. ..................................... 24/114.5; 29/517; 49/352; 74/502.6

[58] Field of Search ......................... 49/352; 74/501 F; 24/114.5; 29/517 X

[56] References Cited

U.S. PATENT DOCUMENTS

| | | | |
|---|---|---|---|
| 3,844,601 | 10/1974 | Rochester, Jr. | 24/114.5 X |
| 4,306,378 | 12/1981 | Fukura et al. | 49/352 |

FOREIGN PATENT DOCUMENTS

| | | | |
|---|---|---|---|
| 100422 | 2/1962 | Netherlands | 29/517 |
| 531202 | 12/1940 | United Kingdom | 74/501 F |

*Primary Examiner*—Philip C. Kannan
*Attorney, Agent, or Firm*—Finnegan, Henderson, Farabow, Garrett & Dunner

[57] ABSTRACT

A window regulator mechanism having a driver device for driving a wire as well as a hook attached to the wire to open or close a window via a holder in which the hook is fitted. The windowpane of the window is held by the holder. The hook has been crimped firmly against the wire except for given lengths of end portions of the hook in the direction in which the wire extends.

3 Claims, 2 Drawing Sheets

HOOK FOR A WIRE-TYPE WINDOW REGULATOR

This application is a continuation of Ser. No. 741,480 filed June 5, 1985, now abandoned.

FIELD OF THE INVENTION

The present invention relates to a window regulator mechanism that has a driver device for driving a wire as well as a hook attached to the wire to move a windowpane up or down via a holder which retains the windowpane and in which the hook is fitted, thereby opening or closing the window. More particularly, the invention relates to a structure which connects together the wire and the windowpane via the hook.

BACKGROUND OF THE INVENTION

A connector structure for a window regulator mechanism using a wire of this kind is disclosed in Japanese Utility Model Laid-open No. 103376/1980. This conventional structure is shown in FIG. 3, where a wire 13 is inserted into a hole 21 formed in a hook 24. Then, the side surface of the hook 24 is firmly fixed to the wire 13. Subsequently, the hook 24 is fitted into a hole formed in a holder (not shown) for holding a windowpane to couple the wire 13 to the windowpane. The hook 24 retained in the hole in the holder drives the holder on its both end surfaces.

However, this conventional structure presents a problem as described below. Referring to FIG. 4, the end surfaces of the hook 24 are deformed, because they have been crimped. Accordingly, they are not planar. Thus, the pressure of contact applied between the hook 24 and the hole in the holder is quite large at some locations, deforming the hole in the holder. This gives a play between the holder and the hook 24. As a result, the holder becomes loose, and the windowpane rattles when a vehicle carrying the windowpane is running.

SUMMARY OF THE INVENTION

Accordingly, it is the main object of the present invention to provide a connector structure in which a hook and a holder are in contact with each other at uniform pressure of contact throughout their contact surfaces.

The above object is achieved in accordance with the teachings of the invention by a connector structure having a hook which is attached to a wire and fitted in a holder and which has been crimped firmly against the wire except for given lengths of end portions thereof in the direction in which the wire extends.

The volume change caused by the crimping appears evenly at both end surfaces of the hook, keeping these end surfaces planar. Thus, the inner wall of the hole in the holder and the both end surfaces of the hook bear on each other on their flat surfaces. Since the inner surface of the hole in the holder receives uniform surface pressure, no deformation occurs.

DETAILED DESCRIPTION OF THE INVENTION

Figure 1:
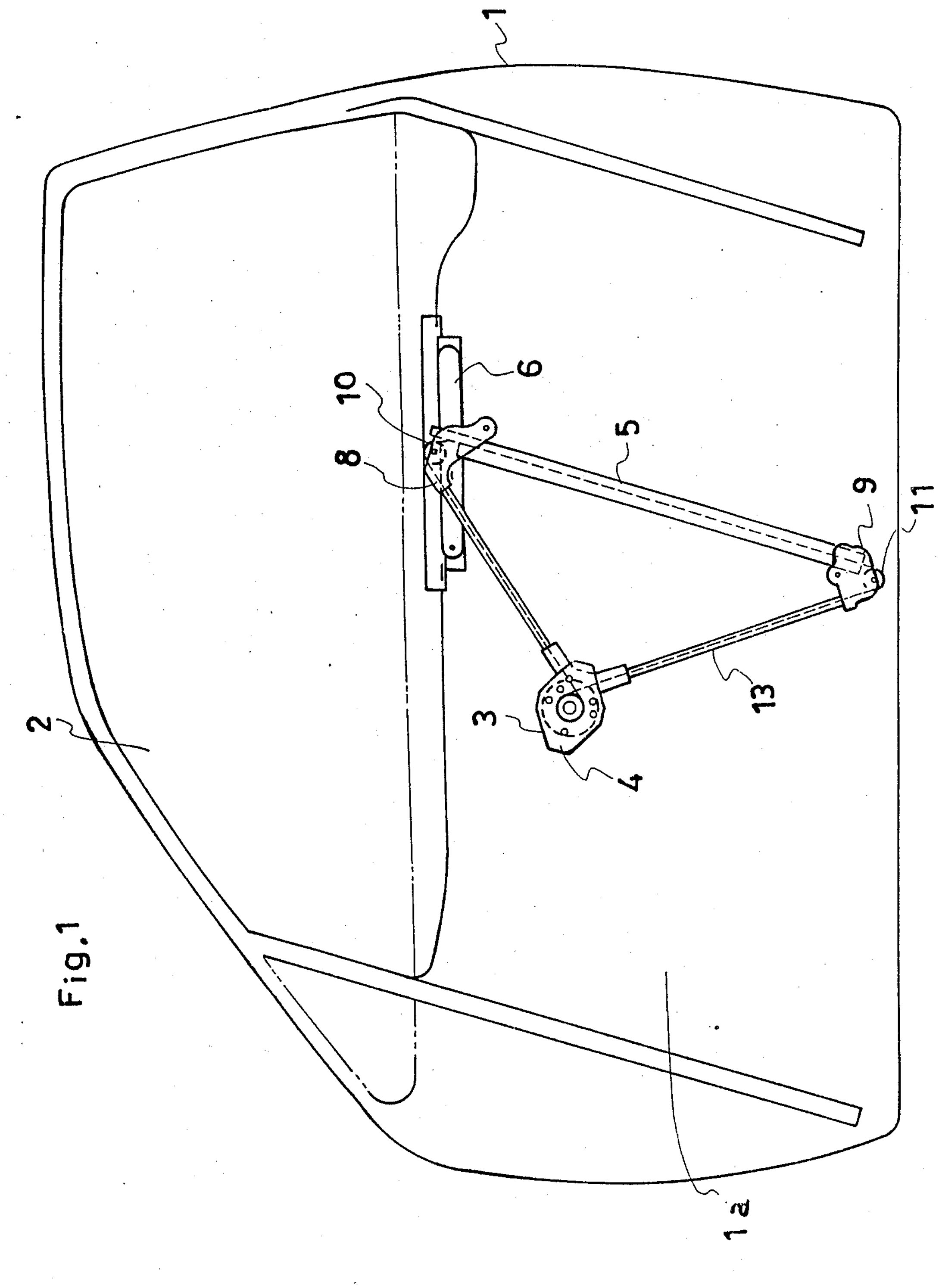
FIG. 1 is a front elevation of a window regulator mechanism using a wire.

Referring first to FIG. 1, there is shown a window regulator mechanism using a wire. Shown in this figure are a door 1, a door glass (windowpane) 2, and the driver device 3 of the window regulator. The driver device 3 is supported on a base 4, which is firmly secured to a gear inner plate 1*a* as by a bolt. A holder 6 engages with a bracket 7 that is rigidly affixed to the lower end of the door glass 2. The holder 6 is moved upward or downward while guided by a guide 5. Mounting plates 8 and 9 attached to the upper and lower ends, respectively, of the guide 5 are mounted to the door 1. Pulleys 10 and 11 pivotally mounted to the mounting plates 8 and 9, respectively, guide a wire 13.

When the wire 13 is rotated in a clockwise direction as viewed in FIG. 1 by driving the driver device 3, the door glass 2 is pulled down via the holder 6. When the wire 13 is rotated in a counterclockwise direction, the glass 2 is elevated. The driver device is equipped with a known anti-reversion mechanism (not shown) to retain the glass 2 at a given position.

Figure 2:
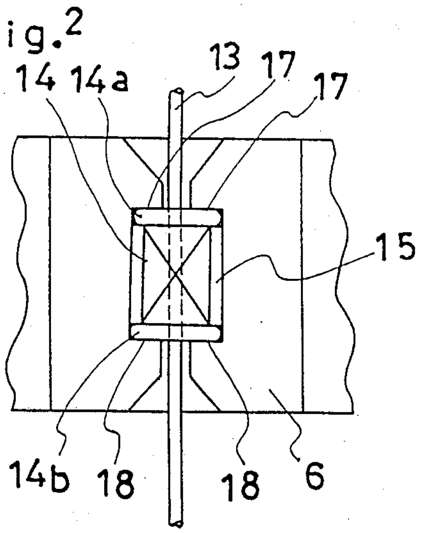
FIG. 2 is a front elevation of the structure of the mechanism shown in FIG. 1 which connects a wire to a door glass.
Figure 3:
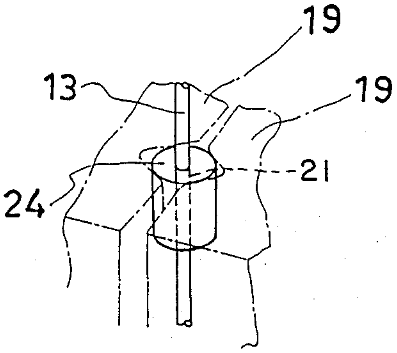
FIGS. 3 and 4 are perspective views of a conventional hook, showing the conditions before and after, respectively, it is crimped.
Figure 4:
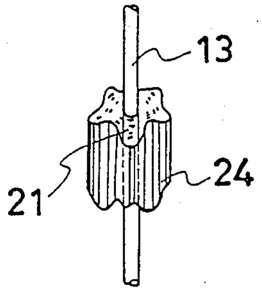

The rotation of the wire 13 is transmitted to the holder 6 by a hook 14 firmly fixed to the wire 13. More specifically, as shown in FIG. 2, the holder 6 has a rectangular hole 15 in which the hook 14 is fitted and retained there. Thus, when the hook 14 is moved upward, the upper end 14*a* of the hook bears against the upper wall 17 of the hole 15 to thereby elevate the holder 6. Conversely, when the hook 14 is moved downward, the lower end 14*b* of the hook bears against the lower wall 18 of the holder 6, lowering the holder 6. The holder 6 has slits extending above and below the hole 15 to guide the wire 13.

Figure 5:
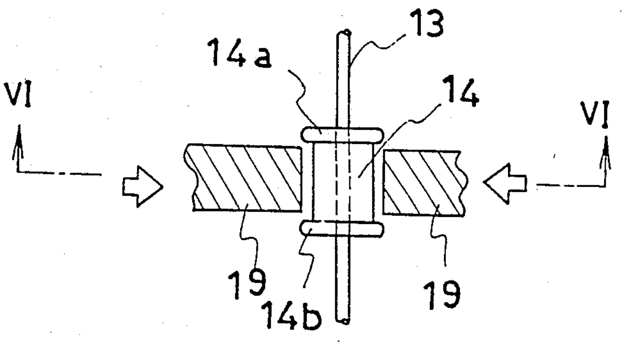
FIG. 5 is a front elevation of a hook according to the present invention, showing the condition before it is crimped.
Figure 6:
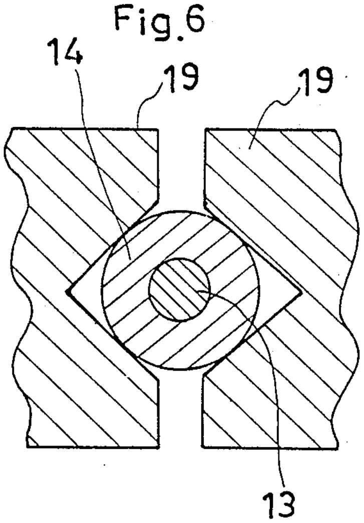
FIG. 6 is a cross-sectional view taken on line VI—VI of FIG. 5.
Figure 7:
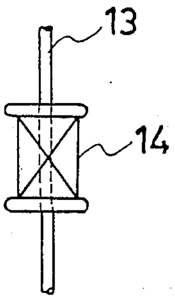
FIG. 7 is a front elevation of a hook, showing the condition after it is crimped.
Figure 8:
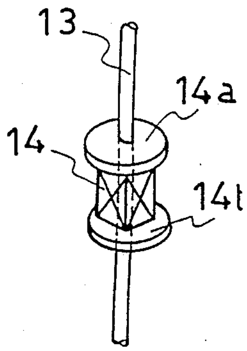
FIG. 8 is a perspective view of a hook, showing the condition after it is crimped.

Referring next to FIG. 5, the hook 14 takes the form of a cylinder before it is crimped. Circular flanges 14*a* and 14*b* are formed at both ends of the hook. The side surface of the hook 14 is crimped with jigs 19 after the wire 13 has been inserted in the hole in the hook 14, in order that the hook 14 is firmly fixed to the wire 13. As shown in FIG. 6, each jig 19 has a V-shaped groove. After the crimping operation, the hook 14 is made rectangular except for the flanges 14*a* and 14*b* at its both ends, as shown in FIG. 7. As can be seen from FIG. 8, since the hook 14 has been crimped except for the flanges 14*a* and 14*b* at its both ends, the volume change along the wire which is caused by the crimping is absorbed evenly by the flanges at the both ends. Therefore, the end surfaces of the flanges 14*a* and 14*b* are maintained planar after the hook is crimped. In this way, the flat surfaces of the flanges 14*a* and 14*b* of the hook 14 bear on the upper wall 17 and the lower wall 18 of the hole 15 in the holder 6. Since the hook 14 is stretched uniformly by the crimping in the direction in which the wire extends, the distance between the walls 17 and 18 of the hole 15 in the holder 6 can be set by taking account of the distance between the both ends of the crimped hook 14. Hence, the gap between the hook 14 and the hole 15 in the direction in which the wire 13 extends can be minimized. This prevents the holder 6 from becoming loose, thus keeping the door glass 2 from rattling.

In the above example, the hook 14 is provided with the flanges 14*a* and 14*b* at its both ends. It is also possible to shape the hook 14 into a form having neither the flange 14*a* nor 14*b*.

It might be suggested that the end surfaces of the hook are ground to make them planar after the hook is crimped. However, this may damage the wire, leading to a cutting of the wire.

In contrast, the novel mechanism does not damage the wire. Since the both end portions of the hook are not crimped, the crimping force that acts to reduce the diameter of the wire decreases slowly toward the both ends of the hook. Therefore, the stress within the wire is gradually released, preventing the wire from breaking. Also, the tensile force of the wire will not decrease.

What is claimed is:

1. A hook assembly for a wire-type window regulator, comprising:

a. a wire; and b. a hook body having:

a normally cylindrical intermediate portion, two circular flange portions, one at each axial end of said intermediate portion, each of said flange portions having a diameter greater than the diameter of said intermediate portion and a planar end surface, and an axially positioned hole extending through said hook body, said wire being inserted through said hole, wherein said intermediate portion is crimped substantially evenly along it axial length to secure said hook body to said wire, said intermediate portion being substantially rectangular in cross section after being crimped and said flange portions remaining uncrimped.

2. The hook assembly of claim 1, wherein said flanges are separated by a first predetermined axial distance before said intermediate portion is crimped and said flanges are separated by a second predetermined axial distance greater than said first predetermined distance after said intermediate portion is crimped.

3. A method of securing a hook body to a wire of a wire-type window regulator, the hook body having an intermediate portion, two flange portions at axially opposed ends of the intermediate portion and having planar end surfaces, and an axially positioned hole extending through the hook body, the method comprising the steps of:

inserting the wire through the hole of the hook body; and crimping the intermediate portion of the hook body substantially evenly along its axial length to provide the intermediate portion with a substantially rectangular cross section and to secure the hook body to the wire while leaving the flange portions uncrimped

* * * * *